United States Patent
Barrett

[15] 3,698,184
[45] Oct. 17, 1972

[54] LOW POLLUTION HEAT ENGINE
[72] Inventor: George M. Barrett, R.R. # 5, Galt, Ontario, Canada
[22] Filed: Nov. 4, 1970
[21] Appl. No.: 86,738

[52] U.S. Cl............................................60/36, 60/24
[51] Int. Cl................................................F01k 25/00
[58] Field of Search.......60/36, 1, 95, 57 R, 57 T, 62; 418/8

[56] References Cited

UNITED STATES PATENTS

| 1,042,994 | 10/1912 | Wilson............................418/8 |
| 2,468,373 | 4/1949 | Makaroff........................418/8 |
| 551,226 | 12/1895 | Ofeldt.............................60/36 |
| 671,723 | 4/1901 | Fisher.............................60/36 |
| 3,169,375 | 2/1965 | Velthuis........................60/1 X |

FOREIGN PATENTS OR APPLICATIONS

| 465,802 | 1937 | Great Britain.................60/36 |

Primary Examiner—Edgar W. Geoghegan
Assistant Examiner—Allen M. Ostrager
Attorney—Diller, Brown, Ramik & Holt

[57] ABSTRACT

This disclosure relates to a heat engine which operates generally on the basis of the Carnot cycle and includes a rotor mounted within a chamber and sealed relative to the chamber by means of a plurality of radiating vanes. Gas compressed in the mechanical compression cycle of the engine is by-passed to the part of the invention wherein isothermal expansion normally occurs in the Carnot cycle, and these compressed gases are heated to supply greater energy thereto to produce a greater energy working in both the isothermal expansion phase and the reversible adiabatic expansion phase and the reversible adiabatic expansion phase of the cycle. In addition, external flow passages are connected to the chamber of the engine in the area where isothermal compression occurs for accelerating the isothermal compression. It is proposed to use a substantially pollution free hydrocarbon as the fuel for the heater, and the same hydrocarbon may be utilized as the gas sealed within the engine.

9 Claims, 2 Drawing Figures

PATENTED OCT 17 1972

3,698,184

INVENTOR
GEORGE M. BARRETT

By
*[signature]*
ATTORNEYS

LOW POLLUTION HEAT ENGINE

This invention relates in general to new and useful improvements in rotary engines, and more particularly to a novel heat engine which operates generally in accordance with the Carnot cycle.

BACKGROUND OF THE INVENTION

It is well known to convert heat energy into mechanical energy in an engine having a gas sealed therein. In accordance with the well known Carnot cycle, by selectively heating and cooling gas within a closed chamber of which one wall is movable, that wall can be made to reciprocate. By connecting the wall to a crankshaft, the reciprocal movement of the wall (piston) is converted into rotary movement to form an engine.

It is also well known that certain hydrocarbon gases, including propane and butane, may advantageously be utilized as a fuel with substantially complete combustion resulting wherein the exhaust gases therefrom constitute only minor pollutants as compared to other fuels customarily utilized in conjunction with internal combustion engines.

SUMMARY OF THE INVENTION

In accordance with this invention, it is proposed to utilize the advantageous features of the Carnot cycle in a rotary engine with the mechanically compressed gases being by-passed from the chamber of the engine through a heater utilizing one of the preferred hydrocarbon gases as a fuel, and returning the heated gas to the engine chamber in the area thereof where normally isothermal expansion occurs, and therein utilize the expansion characteristics of heated gas to produce work to effect rotation of the rotor.

It is also proposed to accelerate the isothermal compression of the gas within the engine chamber by coupling external passages to the chamber for receiving gas from within the chamber, rapidly cooling such gas, and returning the same to the chamber.

Another feature of the invention is the constant resupplying of gas to the engine to replace any such gas as may be lost through the seals of the engine, the gas being supplied to the engine through the by-pass passage.

It is further proposed in accordance with this invention to utilize the same gas fuel supply for operating the heater and for replenishing the gas within the engine, certain hydrocarbon gases being suitable for use not only as a fuel, but also the gas within the engine whereby a single gas supply is required to take care of all operating conditions of the engine.

With the above and other objects in view that will hereinafter appear, the nature of the invention will be more clearly understood by reference to the following detailed description, the appended claims and the several views illustrated in the accompanying drawings:

IN THE DRAWINGS

Figure 2:
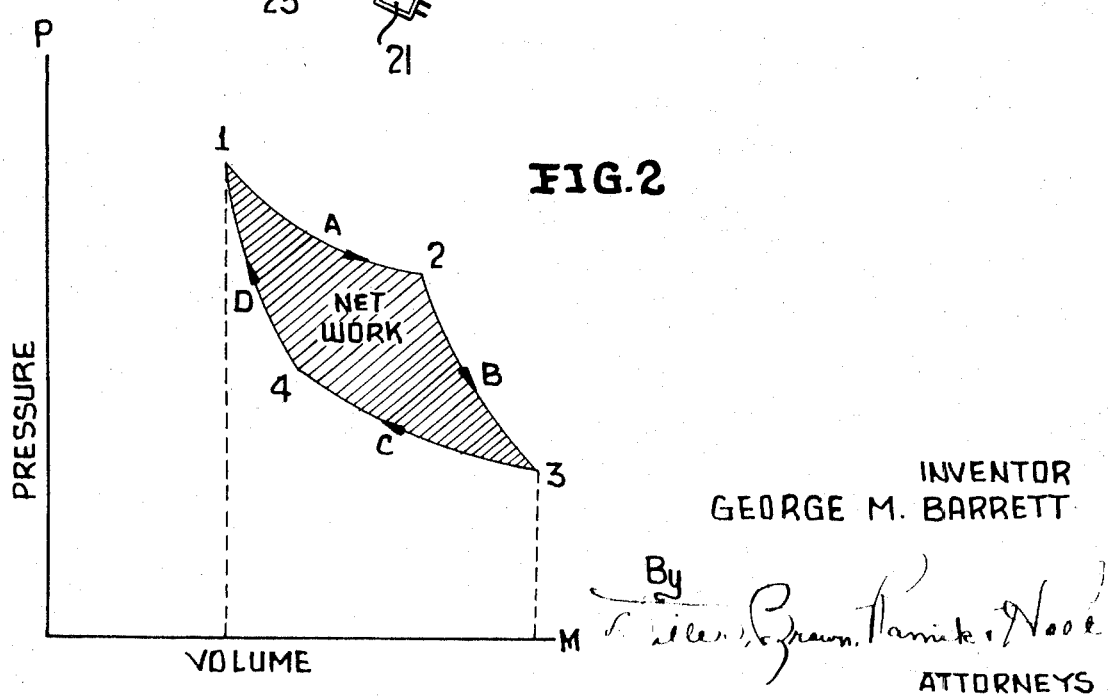
FIG. 2 is a pressure-volume diagram showing the Carnot cycle of a heat engine using a perfect gas.

Reference is first made to FIG. 2 wherein there is illustrated a pressure-volume diagram showing the net work available from a heat engine using a perfect gas operating in accordance with the well known Carnot cycle. Starting at point 1 on the diagram, normally there is an isothermal or constant temperature expansion process between points 1 and 2. This is considered as phase A. In accordance with the Carnot principle, at this time heat is supplied to the engine from a high temperature reservoir and work is produced.

Next, there is a reversible adiabatic expansion process between points 2 and 3, during which the gas continues to expand against a decrease in pressure and does further work, while the temperature of the gas simultaneously drops. This is considered as phase B of the cycle and during this time no heat transfer occurs.

In the third phase of the Carnot cycle (phase C) there is an isothermal compression between 3 and 4 during which some compression work is put back into the gaseous system while the low temperature heat of the gas is transferred to a low temperature heat reservoir.

Finally, in the fourth phase of the Carnot process between points 4 and 1 (phase D) there must be a reversible adiabatic compression in which compression work is required to return the system to its exact starting point, point 1. In accordance with this invention, a rotary engine, generally identified by the numeral 10 is provided. This rotary engine basically operates on the Carnot cycle principle, but has certain improvements incorporated therein which permits the same to produce an acceptable amount of work so as to be economically feasible.

The engine 10 basically includes a housing 11 defining a generally cylindrical chamber 12. A rotor 13 is mounted within the housing 11 for rotation about an axis offset from the axis of the cylinder 12 whereby the rotor closely approaches the housing 11 at one point in the chamber and is disposed remote from the housing at an opposite point in the chamber, the point where the rotor 13 comes closest to the housing 11 being a point of maximum gas compression and corresponding to point 1 of the pressure-volume diagram of FIG. 2.

It is to be noted that the rotor 13 is provided with a plurality of circumferentially spaced vanes 14. The specific constructional details of the vanes 14 and the mounting thereof relative to the rotor 13 have not been illustrated inasmuch as these features do not constitute a part of the invention. It is to be understood, however, that the vanes 14 are mounted for radial sliding movement in the rotor 13 and are constantly urged radially outwardly from the rotor 13 so that they are in constant sealing contact with the walls of the chamber 12.

In the illustrated embodiment of the invention, the rotor 13 is intended to rotate in a clockwise direction. Shortly in advance of point 1, the housing 11 is provided with an exit port 15 for compressed gases, the exit port 15 being coupled to a by-pass line 16. The by-pass line 16 is, in turn, coupled to a return port 17 which is circumferentially elongated and opens into the chamber between the previously mentioned point 1 and a circumferentially spaced point 2 which corresponds to point 2 of the pressure-volume diagram of FIG. 2.

Compressed gases passing through by-pass line 16 are heated to a high temperature within a heater 18 before being supplied back into the chamber 12 for reaction against the vanes 14 to effect rotation of the roller 13. While any type of energy may be utilized in the heater 18, in accordance with this invention there is a preferred type of heating which will be discussed hereinafter.

In order that the operation of the engine 10 and the speed of rotation of the rotor 13 may be controlled, there is incorporated in the by-pass line 16 a throttle valve 19. While the throttle valve 19 is illustrated as being disposed between the heater and the return port 17, it is to be noted that it may be incorporated in the by-pass passage 16 between the exit port 15 and the heater 18.

Under certain conditions it may also be desirable to incorporate a check valve 20 in the by-pass passage 16. The check valve 20 would be principally utilized when the throttle valve 19 is in the illustrated position. On the other hand, if the throttle valve 19 were moved to the general position of the check valve 20, there would be no need for the check valve.

At this it is desired to more particularly correlate the heat engine 10 with the pressure-volume diagram of FIG. 2. It is to be noted that in addition to the points 1 and 2 previously mentioned, the diagrammatic showing of the engine 10 also includes points 3 and 4 which correspond to points 3 and 4 on the pressure-volume diagram of FIG. 2.

In addition, the gaseous condition phase between points 1 and 2 is designated as phase A. In a like manner, the gaseous condition phase between points 2 and 3 is designated as phase B. The gaseous condition phase between points 3 and 4 is identified as phase C while the gaseous condition phase between points 4 and 1 is identified as phase D. All of these phases correspond to the four phases A, B, C and D on the pressure-volume diagram of FIG. 2.

In the areas of gaseous condition phase C, it is highly desirable that a maximum amount of retained heat be removed from the gas within the chamber 12. Accordingly, the housing 11 is provided with external flow passages 21 of which only three have been illustrated. These external flow passages are preferably in the form of small housings which have external fins so as to facilitate heat transfer. The passages 21 open into the chamber 12 through the ports 22. It will be readily apparent that as the rotor 13 rotates, the gas within the chamber 12 will be progressively compressed and the gas will be free to flow into the passages 21. As the vanes 14 pass the respective passages, compressed gas within the passages will flow thereout of partially due to the cooling effect of the fins surrounding the housings defining the passages and partially due to the fact that immediately behind each vane as it passes the respective port 22, the pressure is lower than at the time when the next succeeding vane substantially reaches the same port 22.

It is also to be noted that in the illustrated form of the invention, the passages 21 have been connected together by circumferential flow passages 23. These may or may not be utilized. When they are utilized, there will also be flow in a generally counterclockwise direction of gases through the passages 21 and 23 due to the fact that the pressure within the chamber 12 adjacent the point 4 will be greater than that adjacent the point 3.

It will be readily apparent that by reducing the heat load of the gases in the chamber 12 between points 3 and 4, the gas will be substantially compressed, making it easier to further compress the gases as they pass between points 4 and 1 wherein a maximum compression of the gases occurs.

Figure 1:
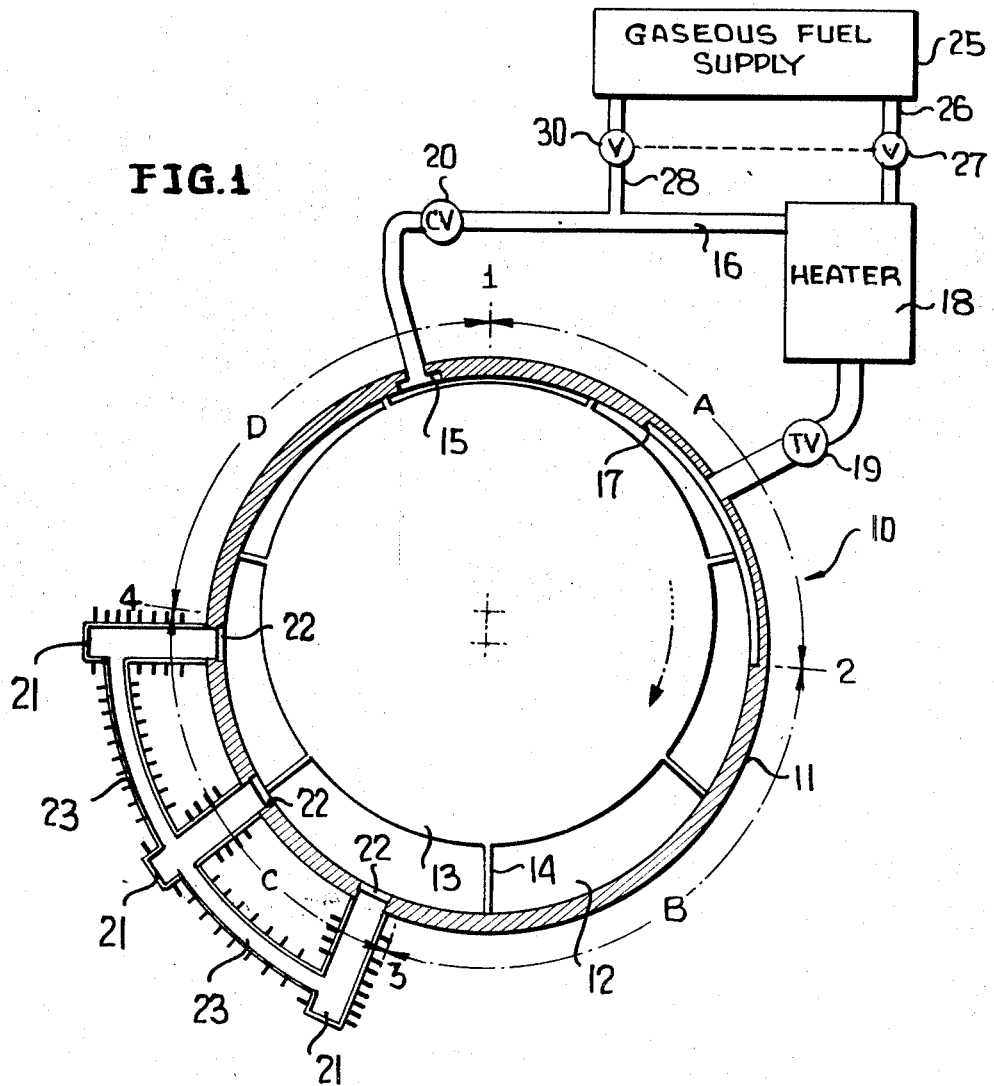
FIG. 1 is a schematic view of a heat engine constructed in accordance with this invention.

It is to be understood that with the specific construction of the heat engine 10, the slope of the pressure-volume line between points 1 and 2 may be maintained more nearly flat notwithstanding the natural increase in volume of the gases due to the increase in spacing between the rotor and the housing between points 1 and 2. In a like manner, the slope of the line C between points 3 and 4 can be made more flatter by more effectively compressing the gases, thereby holding the pressure of the gases between points 3 and 4 to a minimum. Thus, the efficiency of the heat engine 10 can be much improved and an efficient engine operation is possible with sufficient power being available to run desired equipment. It is believed to be feasible to utilize heat engines of the type illustrated in FIG. 1 in the operation of vehicles and other equipment.

While the heater 18 may be of any construction, it is proposed to form the heater 18 of the combustion type and utilize a gaseous fuel. It has been found that certain hydrocarbon gases, including propane and butane, for example, may be effectively utilized as fuels. These hydrocarbon gases, when burned, have a relatively pollution free exhaust as compared to the exhaust of internal combustion engines.

In accordance with this invention, a fuel tank 25 is provided wherein the hydrocarbon gas fuel is maintained in a liquid form under pressure. The fuel will be supplied to a heater through a pipe 26 in which a control valve 27 is positioned.

At this time it is pointed out that the construction of the heater 18 may vary greatly depending upon the particular use of the heat engine 10. For example, if the heat engine 10 is to be operated at a constant speed, then a simple burner construction may be provided. On the other hand, if it is to be utilized in conjunction with equipment, such as a vehicle, where the power demand varies greatly, the burner may be of a several stage construction including a pilot type burner which will provide sufficient power for the heat engine 10 to operate at what may considered to be idle speeds.

It is also proposed here to utilize the same gas as that supplied as fuel to the heater 18 as the gas within the chamber 12. It has been found that certain hydrocarbon gases, including propane and butane, would serve amply well as the gas within the heat engine 10. Propane in particular has been found to be an excellent lubricant for the vanes 14 which are in sliding contact with the walls of the housing 11 defining the chamber 12.

It is fully recognized that there is always a minor leakage of gas under pressure from a rotary engine. Therefore, it is proposed to provide for the constant replacement of gas which may be lost from the chamber 12. To this end, a further line 28 extends from the fuel supply tank 25 to the by-pass passage 16. A valve 30 controls the flow of gas through the line 28. If desired, the valves 27 and 30 may be interconnected so that gas will be delivered from the gaseous fuel supply 25 to the heat engine 10 only when the heater 18 is functioning and the engine is running.

It is also propose to salvage any gas which may escape out of the housing 11 by mounting the housing 11 within a simple casing (not shown) and exhausting air and other gases surrounding the housing 11 into the heater 18 for the purpose of burning escaped gases so that there will be no wasted fuel due to leakage.

While it is proposed to utilize the same hydrocarbon gas as fuel for the heater and as the gas within the chamber 12, it is to be understood that a different gas could be supplied to the chamber 12. However, such different gas would still be connected to the chamber 12 through the by-pass passage 16 in the manner illustrated except that it would be still in a separate tank from the fuel supply.

Although only a preferred embodiment of the invention has been specifically illustrated and described herein, it is to be understood that minor variations may be made in the heat engine without departing from the spirit and scope of the invention, as defined by the appended claims.

I claim:

1. A heat engine of the type including a housing defining a generally cylindrical chamber, a rotor mounted within said chamber in eccentric relation, and vanes carried by said rotor in sliding sealing contact with said housing, said rotor being closest to said housing at one point in said chamber and most remote from said housing at a second point in said chamber, a working gas in said chamber, and in accordance with the Carnot cycle of operation said engine and said working gas having four gaseous conditions in sequence during rotation of said rotor as follows: A-isothermal expansion, B-reversible adiabatic expansion, C-isothermal compression and D-reversible adiabatic compression; the improvement residing in a by-pass passage coupled to said chamber on opposite sides of said one point and in the areas of gaseous conditions D and A, respectively, heater means for heating gases flowing through said by-pass passage to accelerate provide said isothermal expansion, sealed external flow counterflow passage means connected to said chamber for receiving gases from said chamber compressed by the action of said rotor and returning such gases to said chamber in the area of lower pressure gaseous condition C, and cooling means coupled to said external flow passage means for accelerating providing said isothermal compression.

2. The engine of claim 1 wherein said by-pass passage has an entrance end coupled to said chamber shortly in advance of said one point in the direction of rotor rotation for receiving gases from said chamber under maximum mechanically compressed condition, and said by-pass passage has an exit end coupled to said chamber over a large part of said area of gaseous condition A.

3. The engine of claim 1 wherein said external counterflow passages are primarily surge passages for effective maximum gas cooling.

4. The engine of claim 1 wherein said external counterflow passages are primarily surge passages for effective maximum gas cooling, there being a plurality of such surge passages spaced circumferentially around said chamber.

5. The engine of claim 1 wherein said external flow counterflow passages are primarily surge passages for effective maximum gas cooling, there being a plurality of such surge passages spaced circumferentially around said chamber, and said surge passages being interconnected remote from said chamber for gaseous flow circumferentially around said chamber in a direction opposite to the direction of rotation of said rotor.

6. The engine of claim 1 wherein said heater means are of the type utilizing a gaseous fuel of the minimal pollution class, at least a component of and said fuel is also utilized as the gas within said chamber.

7. The engine of claim 1 wherein said heater means are of the type utilizing a gaseous fuel of the minimal pollution class, and at least a component of said fuel is also utilized as the gas within said chamber, said fuel being supplied to said chamber through said by-pass passage.

8. The engine of claim 1 wherein said heater means are of the type utilizing a gaseous fuel of the minimal pollution class, and said fuel is also utilized at least in part as the gas within said chamber, said fuel being supplied to said chamber through said by-pass passage, said fuel gas being at least in part propane.

9. the engine of claim 1 wherein said gas is replenished in said chamber by gas supply means connected to said by-pass passage.

* * * * *